(12) United States Patent
Kwak et al.

(10) Patent No.: US 8,866,756 B2
(45) Date of Patent: Oct. 21, 2014

(54) TOUCH SCREEN PANEL

(75) Inventors: Won-Kyu Kwak, Yongin (KR); Woo-Sik Jun, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 271 days.

(21) Appl. No.: 12/949,252

(22) Filed: Nov. 18, 2010

(65) Prior Publication Data

US 2011/0248938 A1 Oct. 13, 2011

(30) Foreign Application Priority Data

Apr. 12, 2010 (KR) .................. 10-2010-0033267

(51) Int. Cl.
*G06F 3/041* (2006.01)
*G06F 3/044* (2006.01)

(52) U.S. Cl.
CPC ...... *G06F 3/044* (2013.01); *G06F 2203/04111* (2013.01)
USPC ...................... 345/173; 178/18.01; 178/18.06

(58) Field of Classification Search
USPC ......... 345/173–178; 178/18.01, 18.03, 18.06, 178/19.01, 19.03; 324/660, 662, 663, 686
See application file for complete search history.

(56) References Cited

U.S. PATENT DOCUMENTS

| | | | | |
|---|---|---|---|---|
| 7,864,503 | B2 * | 1/2011 | Chang | 361/288 |
| 8,228,312 | B2 * | 7/2012 | Matsubara | 345/174 |
| 2009/0166100 | A1 * | 7/2009 | Matsubara | 178/18.06 |
| 2009/0213090 | A1 * | 8/2009 | Mamba et al. | 345/174 |
| 2010/0123674 | A1 * | 5/2010 | Wu et al. | 345/173 |
| 2010/0128000 | A1 * | 5/2010 | Lo et al. | 345/174 |
| 2010/0164889 | A1 * | 7/2010 | Hristov et al. | 345/173 |
| 2010/0321308 | A1 * | 12/2010 | Lin et al. | 345/173 |
| 2011/0007020 | A1 * | 1/2011 | Hong et al. | 345/174 |
| 2011/0025639 | A1 * | 2/2011 | Trend et al. | 345/174 |
| 2011/0141039 | A1 * | 6/2011 | Lee | 345/173 |

FOREIGN PATENT DOCUMENTS

| | | |
|---|---|---|
| JP | 2008-310550 | 12/2008 |
| JP | 2010-009456 | 1/2010 |
| KR | 10-2003-0058766 A | 7/2003 |
| KR | 10-0788589 B1 | 12/2007 |
| KR | 10-2008-0041384 A | 5/2008 |
| KR | 10-2009-0131149 A | 12/2009 |
| KR | 10-2011-0041043 | 4/2011 |

OTHER PUBLICATIONS

Korean Office action dated Nov. 29, 2011 issued to correspondence application No. KR 10-2010-0333267, 1 page.
Korean Office action dated May 31, 2011 issued to corresponding application No. KR 10-2010-0033267, 3 pages.

* cited by examiner

*Primary Examiner* — Jason Mandeville
(74) *Attorney, Agent, or Firm* — Christie, Parker & Hale, LLP

(57) ABSTRACT

A touch screen panel that that is less susceptible to malfunction by static electricity. The touch screen panel includes: a transparent substrate; sensing cells formed on the transparent substrate, comprising: first sensing cells connected in a first direction; and second sensing cells connected in a second direction intersecting with the first direction; and connecting patterns formed on the transparent substrate, comprising: first connecting patterns connecting the first sensing cells in the first direction, and second connecting patterns connecting the second sensing cells in the second direction; wherein the sensing cells include prominences extending toward adjacent ones of the sensing cells.

18 Claims, 7 Drawing Sheets

TOUCH SCREEN PANEL

CROSS-REFERENCE TO RELATED APPLICATION

This application claims priority to and the benefit of Korean Patent Application No. 10-2010-0033267, filed on Apr. 12, 2010, in the Korean Intellectual Property Office, the entire content of which is incorporated herein by reference.

BACKGROUND

1. Field

Aspects of the present invention relate to a touch screen panel, and particularly a touch screen panel that is prevented from malfunction by static electricity.

2. Description of the Related Art

A touch screen panel is an input device selecting contents displayed on a screen, such as an image display device, or other similar electronic devices displaying an image, using a person's hand or an object to input commands of a user. For this reason, selected instructions at the touch positions are accepted as an input signal. To this end, the touch screen panel is provided on a front face of the image display device and converts the touch positions directly contacting a person's hand or an object into electrical signals.

The touch screen panel can replace a separate input device, such as a keyboard, a mouse or other similar devices, that are connected with the image display device and operated to input signals. Thus, the use of the touch screen panel is being increased. The touch screen panel can be a resistive type, a light sensing type, a capacitive type, or other similar types of touch screen panels.

When the person's hand or the object contacts the touch screen panel in the capacitive type at a touch position, the conductive sensing pattern senses a change in capacitance by other adjacent sensing patterns or ground electrode. The sensed change in capacitance converts the touch position into the input signal as electrical signals. In order to determine the touch position on the contacting surface, the sensing pattern is configured to include first sensing patterns connected in a first direction and second sensing patterns connected in a second direction.

Generally, the first connection patterns and the second connection patterns intersect with each other and there is an insulating layer disposed therebetween to insulate the first connection patterns and the second connection patterns from each other. A width of the first connection patterns and the second connection patterns is relatively narrower than a width of the pattern of the sensory cells. Thus a resistance of the first connection patterns and the second connection patterns is relatively large, and a thickness of the insulator insulating the first and second connection patterns from each other is thin because of a limit of a process to make the touch screen panel. Therefore, an intersection between the first and second connection patterns can be easily damaged by static electricity. When the intersection between the first and second connecting patterns is damaged by static electricity, for example, when a dielectric breakdown occurs, a malfunction of the touch screen panel can be caused.

SUMMARY

Aspects of the present invention provide a touch screen panel that is less susceptible to damage by static electricity.

Aspects of the present invention provide a touch screen panel including a transparent substrate; sensing cells formed on the transparent substrate, and including: first sensing cells connected in a first direction; and second sensing cells connected in a second direction that intersects with the first direction; and connecting patterns formed on the transparent substrate, and including: first connecting patterns connecting the first sensing cells in the first direction; and second connecting patterns connecting the second sensing cells in the second direction, wherein the sensing cells include prominences extending toward adjacent ones of the sensing cells of the sensing cells.

According to another aspect of the present invention, ends of the prominences may be formed to include at least one or more convexo concave patterns.

According to another aspect of the present invention, the convexo-concave patterns may be formed in any one shape selected from a triangular shape, a saw-toothed shape, and a rectangular shape.

According to another aspect of the present invention, a distance between convexo-concave patterns of adjacent ones of the sensing cells may be within a range of 2 µm to 6 µm.

According to another aspect of the present invention, a shortest distance between convexo-concave patterns of adjacent ones of the sensing cells may be within a range of 2 µm to 6 µm.

According to another aspect of the present invention, the prominences may not be formed at ends of the sensing cells that are connected to the connecting patterns.

According to another aspect of the present invention, wherein insulating layers are disposed between the first connecting patterns and the second connecting patterns, and the first and second connecting patterns may intersect with each other.

According to another aspect of the present invention, the first sensing cells are separately patterned to have an independent patterns respectively, and wherein the first sensing cells may be formed to connect in the first direction by the first connecting patterns positioned on layers different than layers having the first sensing cells.

According to another aspect of the present invention, the second sensing cells may be integrally connected with the second connecting patterns.

According to another aspect of the present invention, the first sensing cells and the second sensing cells may be distantly and alternatively positioned in a same layer.

According to another aspect of the present invention, it may further include dummy patterns formed between the prominences of the sensing cells.

According to another aspect of the present invention, the dummy patterns may be formed apart from each other in a same layer as a layer having the sensing cells.

According to another aspect of the present invention, a shortest distance between the dummy patterns and the prominences of the sensing cells may be within a range of 2 µm to 6 µm.

According to another aspect of the present invention, the dummy patterns may include the insulating layers between the dummy patterns and the sensing cells, and the dummy patterns may be disposed in layers different than layers having the sensing cells.

According to another aspect of the present invention, the dummy patterns may be formed to overlap ends of the prominences of the adjacent ones of the sensing cells.

According to another aspect of the present invention, insulating layers are disposed between the first sensing cells and the second sensing cells, and the first sensing cells and the second sensing cells may be alternatively disposed in the different layers.

According to another aspect of the present invention, prominences of the first sensing cells may be formed to overlap prominences of the first sensing cells and prominences of the adjacent ones of the second sensing cells.

According to aspects of the present invention, static electricity can be easily discharged through the prominences by forming the sensing cells including the prominences for extending toward the adjacent sensing cells. For this reason, damage generated by static electricity can be prevented in advance, and the malfunction of the touch screen panel can be prevented.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
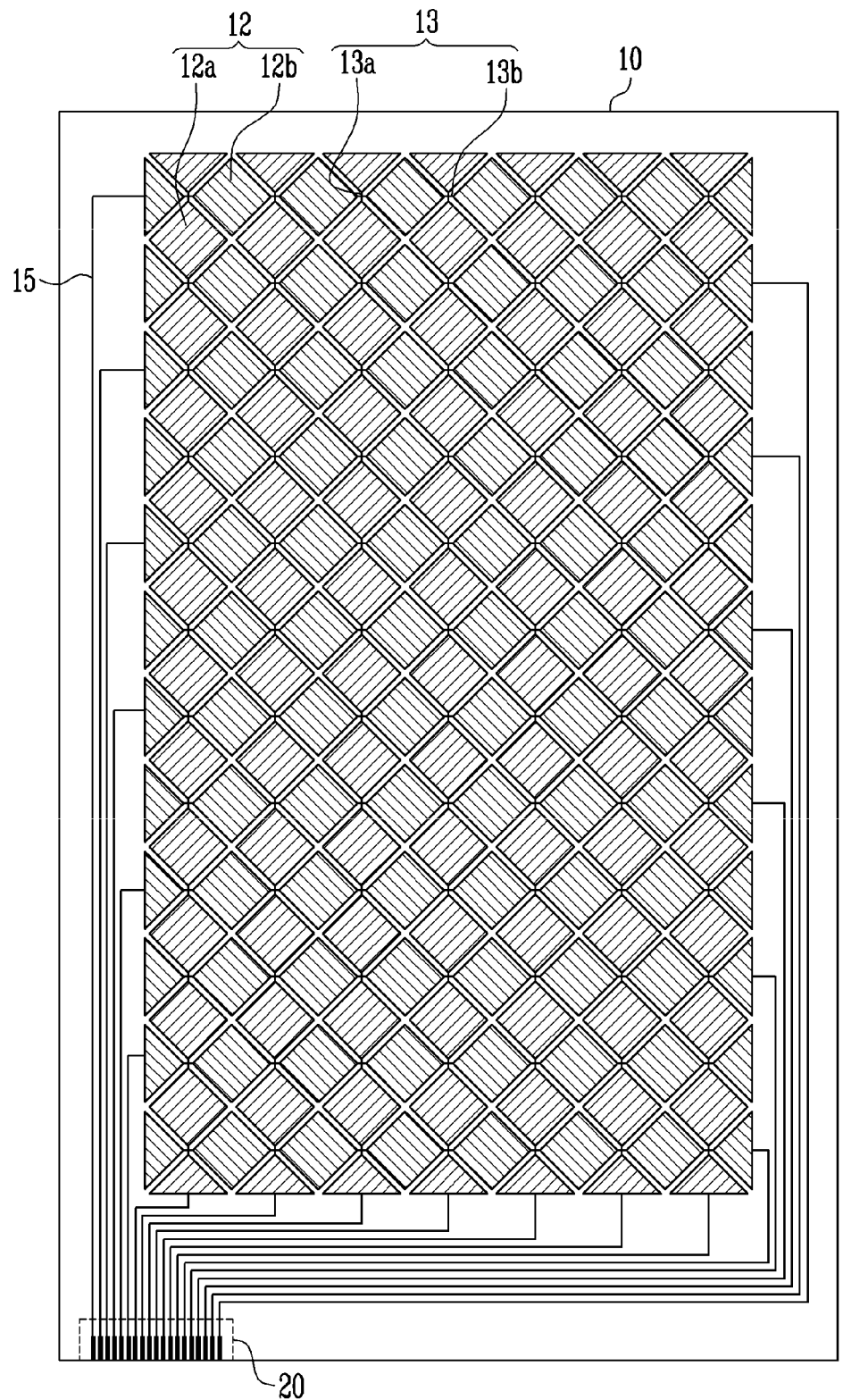
FIG. 1 is a plan view showing a touch screen panel according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

When an element, item or layer is referred to as being disposed or formed "on" another element, item or layer, it can be directly on another element, item or layer or be indirectly on another element, item or layer with one or more intervening elements, items or layers interposed therebetween. In contrast, when an element is referred to as being disposed or formed "directly on" another element, there are no intervening elements present. Also, when an element, item or layer is referred to as being "connected to" another element, it can be directly connected or indirectly connected to another element, item or layer with one or more intervening elements, items or layers interposed therebetween. Hereinafter, like reference numerals refer to like elements. In contrast, when an element, item or layer is referred to as being "directly connected to" another element, item or layer there are no intervening elements, items or layers present.

FIG. 1 is a plan view showing a touch screen panel according to an embodiment of the present invention. Referring to FIG. 1, the touch screen panel includes a transparent substrate 10, sensory cells 12 and connection patterns 13 formed in a touch active region on the transparent substrate 10. Position detecting lines 15 are formed in a touch inactive region around the touch active region and connect the sensory cells 12 to an external driving circuit through a pad unit 20.

The sensory cells 12 include first sensory cells 12a connected with each other in a first direction in the touch active region on the transparent substrate 10. Also, the sensory cells 12 include second sensory cells 12b distributed between the first sensing cells 12a and connected with each other in a second direction intersecting with the first direction. The second sensory cells 12a do not overlap the first sensing cells 12a.

In other words, the first sensory cells 12a and the second sensory cells 12b are alternatively spaced apart from each other and connected in different respective directions and are disposed in a same layer. For example, the first sensory cells 12a are respectively connected with the position detection lines 15 in each row so that they are connected in a row direction. The second sensory cells 12b are respectively connected with the position detection lines 15 in each column so that they are connected in a column direction. However, aspects of the present invention are not limited thereto, and the first sensory cells 12a and the second sensory cells 12b may be positioned in different layers. The first sensory cells 12a and the second sensory cells 12b are made of a transparent electrode material, such as ITO or other similar transparent materials, in order to transmit light from a display panel (not shown) disposed under the sensing cells.

The connection patterns 13 include first connection patterns 13a formed in the first direction and allowing the first sensory cells 12a to be connected in the first direction. The connection patterns 13 also include second connection patterns 13b formed in the second direction and allowing the second sensory cells 12b to be connected in the second direction. The connection patterns 13 are positioned in a same layer and are formed of the same materials as the first sensory cells 12a and the second sensory cells 12b. However, aspects of the present invention are not limited thereto, and the connection patterns 13 may be positioned in the different layers or made of different materials as or the first sensory cells 12a and the second sensory cells 12b.

For example, the first connection patterns 13a are positioned in a layer above or under the layer having the first sensory cells 12a and the second sensory cells 12b. Also, the first connection patterns 13a may be formed of different materials from materials used to form the first sensory cells 12a and the second sensory cells 12b. For example, the first connection patterns 13a may be formed of materials used to form the position detection lines 15.

In this case, the first sensory cells 12a are separately patterned and have independent patterns, but are connected in the first direction by the first connection patterns 13a positioned in the different layers from the first sensory cells 12a. To achieve this, the first sensory cells 12a directly contact the first connection patterns 13a while at least partially overlapping the first connection patterns 13a, or may at least partially overlap the first connection patterns 13a. Insulating layers are disposed between the first sensory cells 12a and the first connection patterns 13a, and the first sensory cells 12a are connected to the first connection patterns 13a through contact holes formed in the insulating layers.

Additionally, at least some of the connection patterns 13 are positioned in a same layer as the first sensory cells 12a and the second sensory cells 12b. For example, the second connection patterns 13b are integrally connected with the second sensory cells 12b when a patterning of the second sensory cells 12b occurs. The first connection patterns 13a and the second connection patterns 13b are insulated from each other. To achieve this, the first connection patterns 13a and the second connection patterns 13b are alternatively disposed and the insulating layers are disposed therebetween.

However, aspects of the present invention are not limited thereto, and the first connection patterns 13a may allow the first sensory cells 12a to connect in the first direction without intersecting with the second connection patterns 13b. As such, the first connection patterns 13a are formed along a detour route overlapping the adjacent second sensory cells 12b.

The position detection lines 15 are electrically connected with rows of the first sensory cells 12a and columns of the second sensory cells 12b. The position detecting lines 15 allow the first sensory cells 12a and the second sensory cells 12b to be connected with an external driving circuit, such as a position detection circuit, through the pad unit 20. The position detection lines 15 are positioned along an edge portion of the touch screen panel, and are not positioned in the touch active region displaying an image on the touch screen panel. The position detection lines 15 can be formed of a wide variety of materials, such as low-resistance materials, including Mo, Ag, Ti, Cu, Ti, Mo/Al/Mo, and other suitable materials, in addition to the transparent electrode materials used for forming the sensory cells 12.

The touch screen panel according to the present embodiment is a capacitive-typed touch screen panel. When the contact objects, such as human hand, stylus pen, and the like contact the touch screen panel, the change of the electrostatic capacitance at the contact position is transmitted from the sensory cells 12 to the drive circuit (not shown) through the pad unit 20 and the position detection lines 15. Then the contact position is confirmed by converting a value of the change of the electrostatic capacity into the electric signal through an X and Y input processing circuit (not shown).

Figure 2:
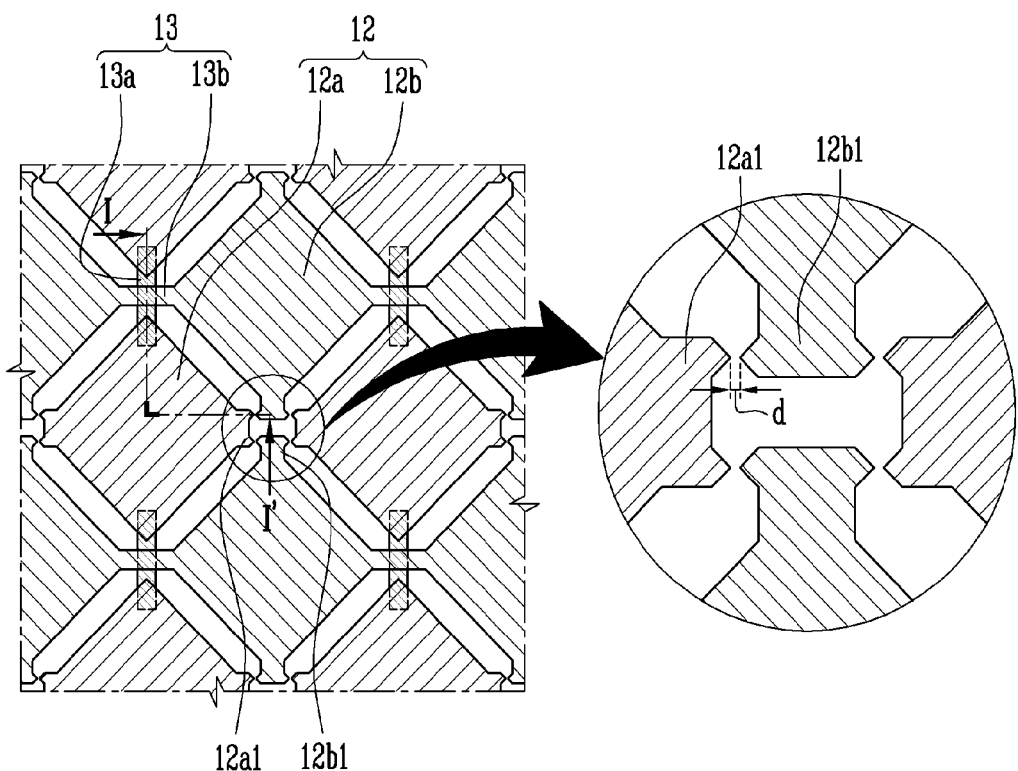
FIG. 2 is a plan view showing connecting patterns and sensing cells of a touch screen panel according to an embodiment of the present invention.
Figure 3:
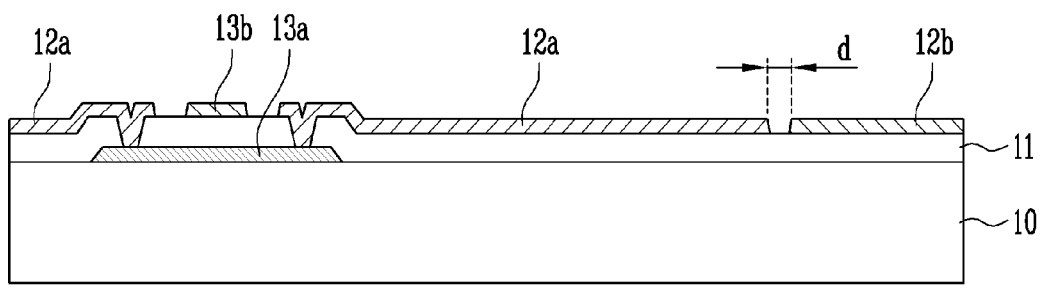
FIG. 3 is a cross-sectional view showing an example of a cross-section taken along line I-I' of FIG. 2.

FIG. 2 is a plan view showing connection patterns 13 and sensory cells 12 of a touch screen panel according to an embodiment of the present invention. FIG. 3 is a cross-sectional view taken along line I-I' of FIG. 2. Referring to FIG. 2 and FIG. 3, the sensory cells 12 are disposed in a tessellating pattern. In other words, rows of the first sensory cells 12a are alternately disposed with rows of the second sensory cells 12b, and columns of the first sensory cells 12a are alternately disposed with columns of the second sensory cells 12b.

The first sensory cells 12a are connected in the first direction by the first connection patterns 13a and the second sensory cells 12b are connected in the second direction by the second connection patterns 13b. In this case, the first direction and the second direction can be set in different directions intersecting with each other, and for example, the first direction and the second direction can be set in the row direction and the column direction, respectively. In other words, the first direction is approximately perpendicular to the second direction.

The second connection patterns 13b are positioned in the same layer as the sensory cells 12, thereby being patterned to integrally connected to the sensory cells 12b.

The first connection patterns 13a are positioned in a different layer from a layer having the sensory cells 12 and the second connection patterns 13b. The first connection patterns 13a connect to the first sensory cells 12a via contact holes formed in the insulators 11. The sensory cells 12, according to the present embodiment of the present invention, include prominences 12a1, 12b1 extending toward adjacent ones of the sensing cells 12.

The prominences 12a1, 12b1 are formed at ends of respective first sensory cells 12a and second sensory cells 12b that are not connected with the connection patterns 13. For example, in the first sensory cells 12a, the prominences 12a1 are formed at the left and right ends of the first sensory cells 12a. The prominences 12a1 are not formed at the upper and the lower ends of the first sensory cells 12a, which are connected with the first connection patterns 13a. In the second sensory cells 12b, the prominences 12b1 are formed at the upper and lower ends of the second sensory cells 12b, and are not formed at the left and the right ends of the second sensory cells 12a, which are connected with the second connection patterns 13b.

The prominences 12a1, 12b1 reduce a distance d between the adjacent sensing cells of the sensing cells 12. For example, the shortest distance d between adjacent ones of the sensing cells 12 is within the range from 2 μm to 6 μm. As such a distance between the adjacent ones of the sensing cells 12 that is a stable separation distance d provides proper driving of the touch screen panel and also the distance d easily induces a discharge of static electricity.

In other words, the distance d between the adjacent sensory cells is decreased by the prominences 12a1, 12b1, thus even if static electricity is present in the sensory cells 12, the discharge of the static electricity is induced through the prominences 12a1, 12b1. In a region susceptible to static electricity, i.e., the intersection between the first and the second connection patterns 13a, 13b, susceptibility to static electricity is improved by preventing dielectric breakdown. The dielectric breakdown is prevented because a voltage difference between the adjacent ones of the sensory cells 12 does not exist, or in other words, the adjacent ones of the sensory cells are in an isoelectric state. Specifically, the prominences 12a1, 12b1 may be formed to include at least one or more convexo-concave patterns at their ends to effectively induce the discharge of static electricity.

For example, as shown in the enlarged view of FIG. 2, the ends of the prominences 12a1, 12b1 are formed of the convexo-concave pattern and have a triangle shape formed at the sides of the prominences 12a1, 12b1. In this case, the distance d between the convexo-concave patterns formed at the prominences 12a1, 12b1 of the adjacent ones of the sensory cells 12 is within the range from 2 μm to 6 μm.

The sensory cells 12 are formed to include the prominences 12a1, 12b1 and extend toward the adjacent ones of the sensory cells 12. Thus, the prominences 12a1, 12b1 easily induce discharge of static electricity through the prominences 12a1, 12b1. Thus, damage to the sensory cells 12, resulting from dielectric breakdown generated by static electricity, can be prevented and a malfunction of the touch screen panel can be prevented.

Figure 4:
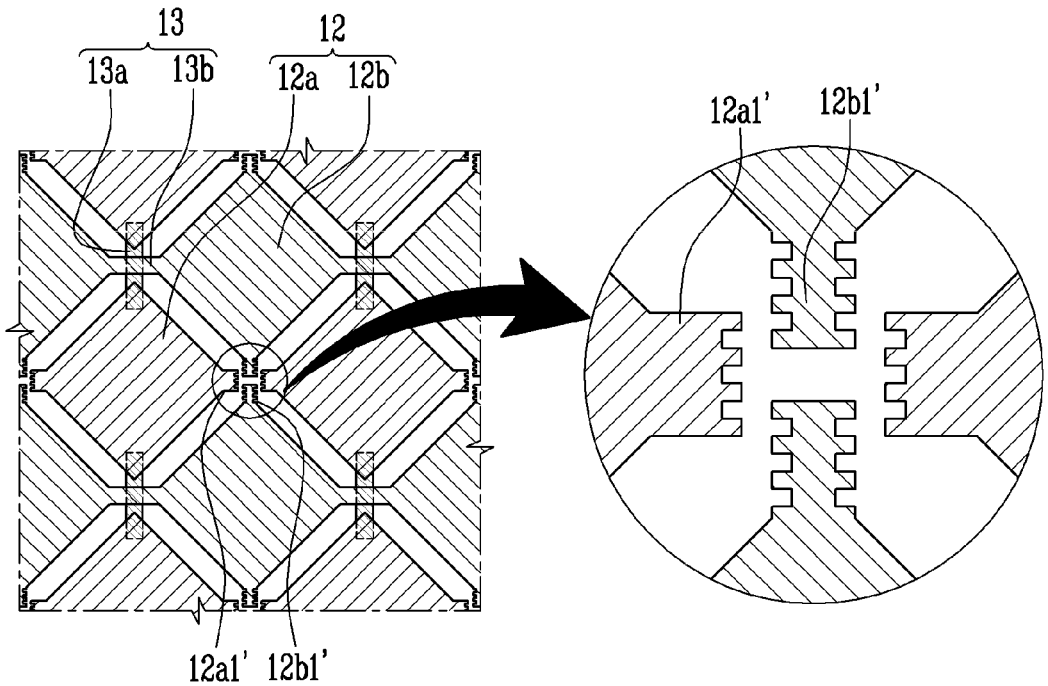
FIG. 4 is a plan view showing connecting patterns and sensing cells of a touch screen panel according to another embodiment of the present invention.
Figure 5:
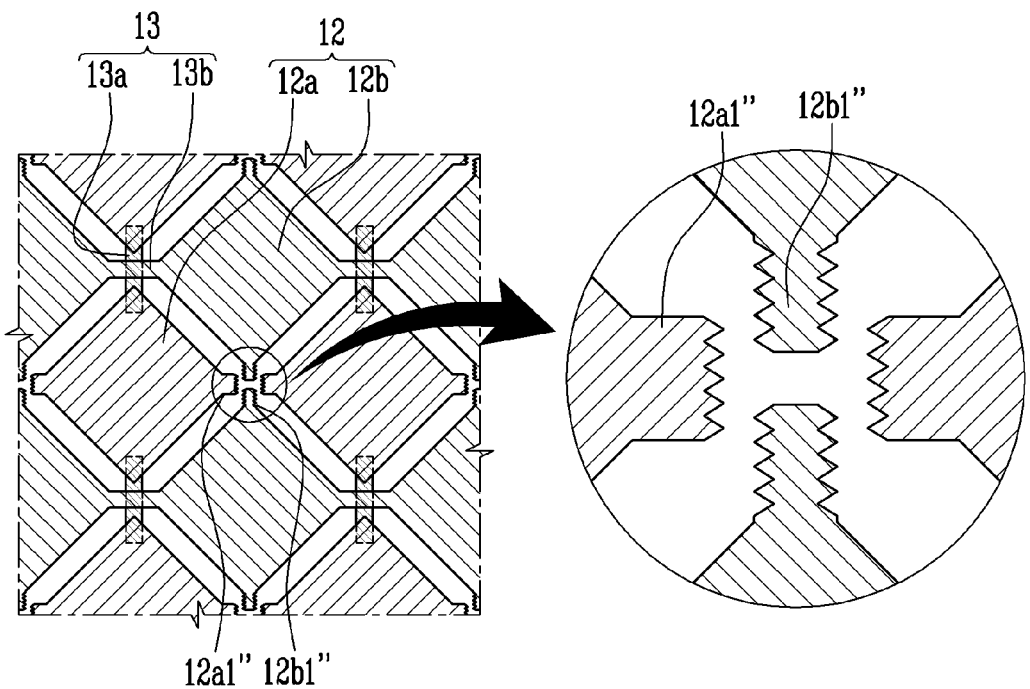
FIG. 5 is a plan view showing connecting patterns and sensing cells of a touch screen panel according to another embodiment of the present invention.

FIG. 4 is a plan view showing connection patterns and sensory cells of a touch screen panel according to another embodiment of the present invention. FIG. 5 is a plan view showing connection patterns and sensory cells of a touch screen panel according to another embodiment of the present invention. In FIG. 4 and FIG. 5, the same or similar components as in FIG. 2 are designated by the same reference numerals, and a detailed description is not provided.

Referring to FIG. 4 and FIG. 5, shapes of the prominences 12a1, 12b1 are not limited to that as shown in FIG. 2, and may be modified in various shapes for inducing the discharge of static electricity. For example, as depicted in FIG. 4, the ends of the prominences 12a1', 12b1' have a rectangular convexo-concave patterns. In addition, as depicted in FIG. 5, the ends of the prominences 12a1", 12b1" have a saw-toothed convexo-concave patterns.

According to aspects of the present invention, static electricity is easily induced to discharge through the prominences 12a1' 12a1", 12b1', 12b1". Thus, damage to the sensory cells 12 and/or the touch screen panel, such as a dielectric breakdown generated by static electricity, can be prevented in advance, and a malfunction of the touch screen panel can be prevented.

Additionally, although not shown, a guard ring preventing static electricity may be disposed so as to surround the touch active region having the sensory cells 12. With the guard ring, it is possible to effectively discharge static electricity generated in the touch active region to the outside by reducing the distance between the guard ring and the prominences 12a1, 12a1', 12a1", 12b1, 12b1', 12b1" in the outermost sensing cells 12.

Figure 6:
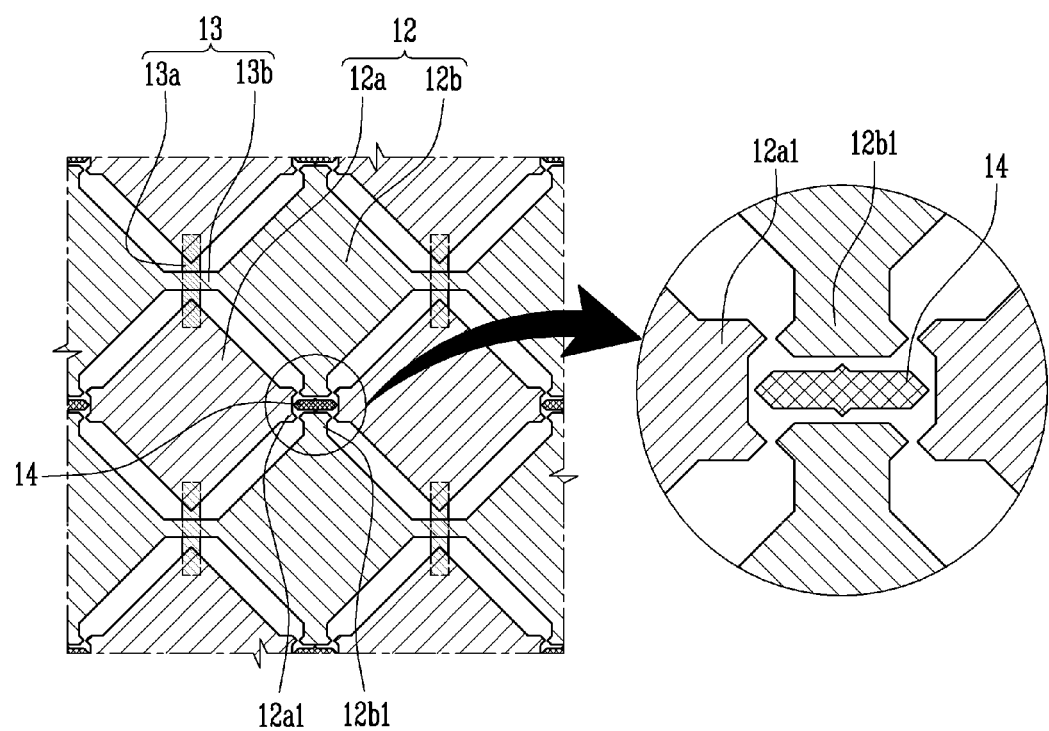
FIG. 6 is a plan view showing connecting patterns and sensing cells of a touch screen panel according to another embodiment of the present invention.

FIG. 6 is a plan view showing connection patterns and sensory cells of a touch screen panel according to another embodiment of the present invention. In FIG. 6, the same or similar components as in FIG. 2 are designated by the same reference numerals and a detailed description of the same or similar components is not provided. Referring to FIG. 6, dummy patterns 14 are further formed between the prominences 12a1, 12b1 of the sensing cells.

The dummy patterns 14 easily discharge static electricity generated in the touch active region. The dummy patterns 12 are positioned close to the prominences 12a1, 12b1 of the sensory cells. The shortest distance d between the prominences 12a1, 12b1 and the dummy pattern 14 adjacent to the prominences 12a1, 12b1 is within the range of 2 μm to 6 μm.

According to an embodiment of the present invention, the dummy patterns 14 are spaced apart from each other and are disposed in a same layer as the sensory cells 12. The dummy patterns are formed of same transparent electrode materials as the sensory cells 12. In the present embodiment, in patterning the sensory cells 12, the dummy patterns 14 are formed at the same time as the sensing cells, thereby easily performing the process. However, aspects of the present invention are not limited thereto, and the dummy patterns 14 may be formed of different materials from the sensory cells 12, such as materials for making the first connection patterns 13a or position detection lines (see 15 in FIG. 1). In addition, the dummy patterns 14 may be positioned in a different layer from the the layer having the sensory cells 12. For example, insulators may be disposed between the dummy patterns 14, and the dummy patterns 14 may be positioned on a layer above or below the sensory cells 12.

According to another embodiment of the present invention, the dummy patterns 14 are positioned in a different layer from the layer having the sensory cells 12, and an area of the dummy patterns 14 is increased. In the present embodiment, the dummy patterns 14 overlap the prominences 12a1, 12ba of the sensory cells. This embodiment will be described hereinafter with reference to FIG. 7 to FIG. 8B.

Figure 7:
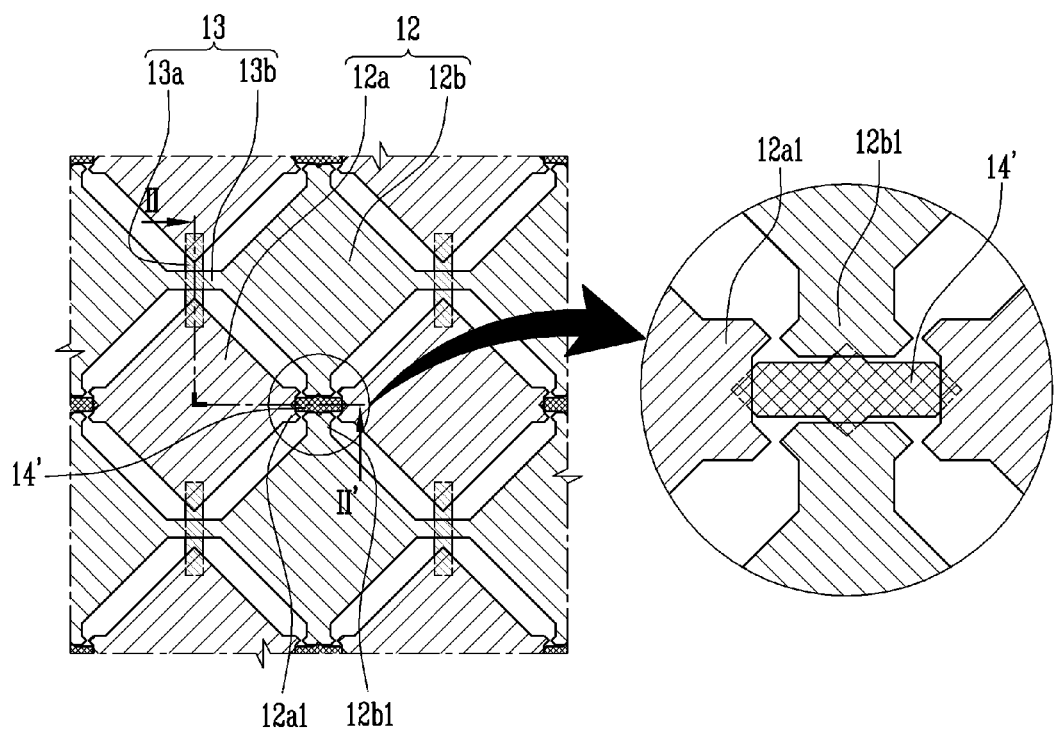
FIG. 7 is a plan view showing connecting patterns and sensing cells of a touch screen panel according to another embodiment of the present invention.
Figure 8A:
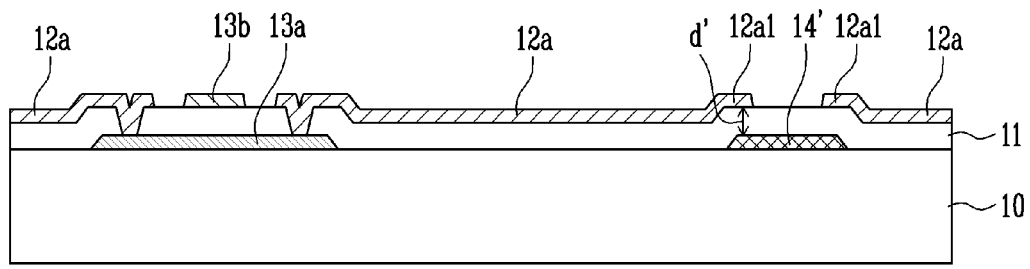
FIG. 8A and FIG. 8B are cross-sectional views showing examples of cross-sections taken along line II-II' of FIG. 7.
Figure 8B:
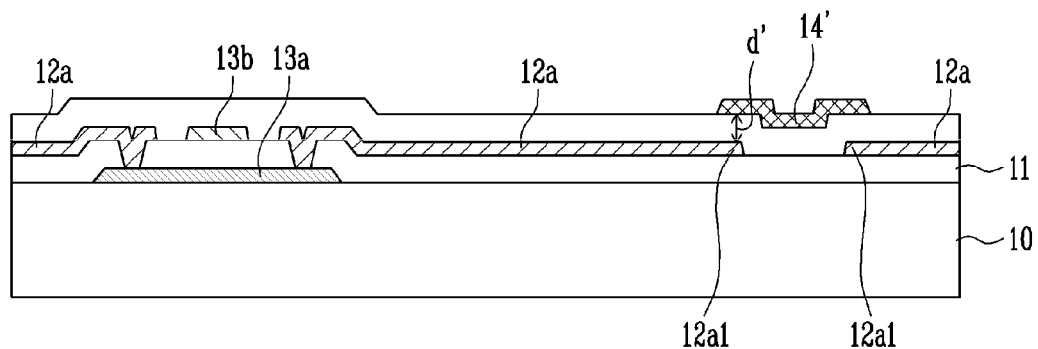

FIG. 7 is a plan view showing connection patterns and sensory cells of a touch screen panel according to another embodiment of the present invention. FIG. 8A and FIG. 8B are cross-sectional views showing examples of cross-sections taken along line II-II' as depicted in FIG. 7. Referring to FIG. 7 to FIG. 8B, the dummy patterns 14' are formed such that their ends overlap the prominences 12a1, 12b1 of the adjacent sensory cells. In the present embodiment, the dummy patterns 14' are positioned in the different layers than the layers having the sensory cells 12. The insulating layers 11 are disposed between the dummy patterns 14' and the sensory cells 12.

For example, as depicted in FIG. 8A, the dummy patterns 14' are positioned under the prominences 12a1, 12b1 of the sensory cells to at least partially overlap the prominences 12a1, 12b1 of the sensory cells. Insulating layers 11 are disposed between the dummy patterns 14' and the prominences 12a1, 12b1. According to another embodiment of the present invention, as depicted in FIG. 8B, the dummy patterns 14' are positioned above the prominences 12a1, 12b1 of the sensory cells so as to at least partially overlap the prominences 12a1, 12b1 of the sensory cells. In the embodiment of FIG. 8B, insulating layers 16 are disposed between the dummy patterns 14' and the prominences 12a1, 12b1. In both the embodiments shown in FIGS. 8A and 8B, the dummy patterns 14' are positioned close to the prominences 12a1, 12ba of the sensory cells. A shortest distance d' between the dummy patterns 14' and the prominences 12a1, 12b1 of the sensory cells is within the range from 2 μm to 6 μm.

Meanwhile, in the embodiments of the present invention as mentioned above, the touch screen panel having a one layer structure on the sensory cells 12, i.e., the touch screen panel having the single-layered structure, in which the first sensory cells 12a and the second sensory cells 12b are positioned in the same layer were described. However, aspects of the present invention are not limited thereto. Aspects of the present invention can use a touch screen panel having a double-layered structure in which the first sensory cells 12a and the second sensory cells 12b are disposed in different layers. A detailed description of the double-layered structure will be described hereinafter with reference to FIG. 9 and FIG. 10.

Figure 9:
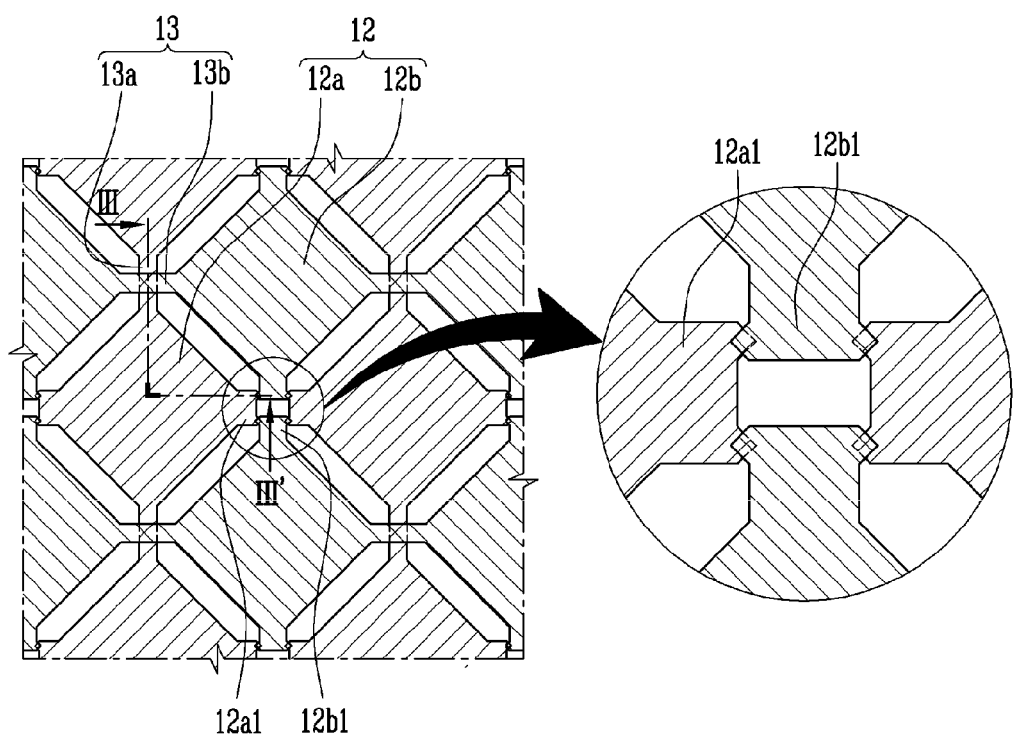
FIG. 9 is a plan view showing connecting patterns and sensing cells of a touch screen panel according to another embodiment of the present invention.
Figure 10:
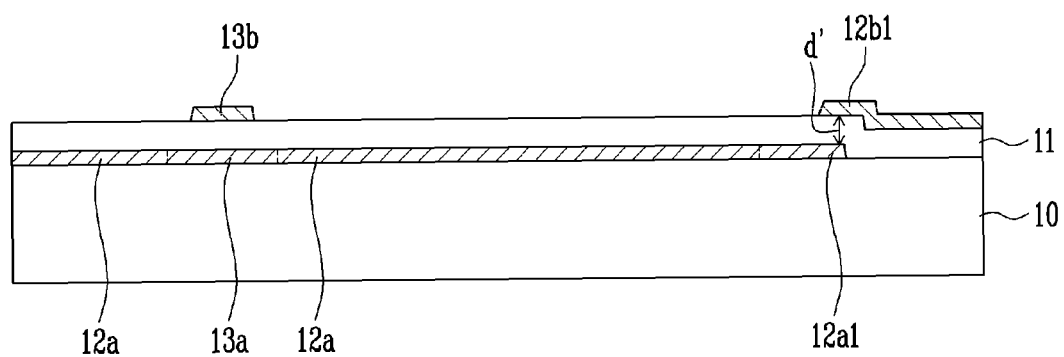
FIG. 10 is a cross-sectional view showing an example of a cross-section taken along line III-III' of FIG. 9.

FIG. 9 is a plan view showing connection patterns and sensory cells of a touch screen panel according to another embodiment of the present invention. And, FIG. 10 is a cross-sectional view showing an example of a cross-section taken along line III-III' of FIG. 9. Referring to FIG. 9 and FIG. 10, the first sensing cells 12a and the second sensing cells 12b may be implemented in a double-layered structure in which they are alternatively disposed, with the insulating layers 11, in the sensing cells 12.

In this case, the first connection patterns 13a are integrally connected with the first sensory cells 12a, and the second connection patterns 13b are integrally connected with the second sensory cells 12b. In the touch screen panel according to the present embodiment, the prominences 12a1, 12ba of the sensory cells are formed to at least partially overlap the prominences 12a1, 12b1 of adjacent sensory cells 12, which are positioned in different layers.

In other words, the prominence 12a1 of the first sensory cells 12a are formed in the first layer to at least partially overlap the prominence 12b1 of the second sensory cells 12b, which are formed in the second layer and are adjacent to the first sensory cells 12a. In particular, ends of the prominences 12a1 overlap with ends of the prominences 12b1. The prominences 12a1, 12b1 of the adjacent sensing cells 12 are positioned close to each other to effectively induce the discharge of static electricity. The shortest distance d between the prominences 12a1, 12b1 of the adjacent sensing cells 12 positioned in different layers is set within the range from 2 μm to 6 μm.

According to aspects of the present invention, as described in the current embodiment, the first sensing cells 12a1 and the second sensing cells 12b1 are positioned in different layers, and the prominences 12a1, 12b1, respectively formed in the first sensing cells 12a and second sensing cells 12b, overlap with each other, at least partially. Thus, the first sensing cells 12a1 and the second sensing cells 12b1 effectively induce discharge of static electricity without having the dummy patterns 14 (see FIG. 6). However, aspects of the present invention are not limited thereto, and the touch screen panel having a double-layered structure could further include the dummy patterns 14.

The dummy patterns 14 may be positioned in a same layer as the first sensory cells 12a or the second sensory cells 12b. Alternatively, the dummy patterns may be positioned in a layer between a layer having the first sensory cells 12a and a layer having the second sensory cells 12b, or in a layer above or below the layers having the first sensory cells 12a and the second sensory cells 12b. In addition, the dummy patterns 14 may be formed without overlapping with the adjacent ones of the sensory cells 12 or may be formed to overlap with the prominences 12a1, 12b1 of the sensory cells 12.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A touch screen panel comprising:
a transparent substrate;
sensing cells formed on the transparent substrate in a plurality of rows and columns, each of the sensing cells comprising four linear sides and four distal ends defined generally by a diamond shape, wherein two first distal ends are opposite each other and extend along an axis of the sensing cells in a first direction and wherein two second distal ends are opposite each other and extend along an axis of the sensing cells in a second direction perpendicular to the first direction, the sensing cells comprising:
first sensing cells connected to each other in a column by respective first connecting patterns extending in the first direction and connected to respective first distal ends of adjacent first sensing cells extending in the first direction, wherein each of the second distal ends of the first sensing ceils has a prominence comprising a plurality of convexo-concave protrusions extending therefrom; and
second sensing cells connected to each other in a row by respective second connecting patterns extending in the second direction and connected to respective second distal ends of adjacent second sensing cells extending in the second direction, wherein each of the first distal ends of the second sensing cells has a prominence comprising a plurality of convexo-concave protrusions extending therefrom;
wherein respective prominences of the first sensing cells extend in the second direction and respective prominences of the second sensing cells extend in the first direction such that each prominence of a first sensing cell is adjacent to a prominence of an adjacent second sensing cell and all prominences are entirely spaced from all other prominences in adjacent sensing cells by a predetermined distance.

2. The touch screen panel as claimed in claim 1, wherein a lateral edge of each prominence of the second sensing cells has a convexo-concave pattern.

3. The touch screen panel as claimed in claim 1, wherein the convexo-concave protrusions are formed in any one shape selected from a triangular shape, a saw-toothed shape, and a rectangular shape.

4. The touch screen panel as claimed in claim 1, wherein a distance between the convexo-concave protrusions of adjacent ones of the sensing cells is within a range of 2 µm to 6 µm.

5. The touch screen panel as claimed in claim 1, wherein a shortest distance between the adjacent ones of the sensing cells is within a range of 2 µm to 6 µm.

6. The touch screen panel as claimed in claim 1, wherein the prominences are not formed at ends of the sensing cells that are connected to the connecting patterns.

7. The touch screen panel as claimed in claim 1, wherein the first connecting patterns and the second connecting patterns intersect with each other, and wherein insulating layers are disposed between the first connecting patterns and the second connecting patterns.

8. The touch screen panel as claimed in claim 1, wherein the first sensing cells are separately patterned to have independent patterns, respectively, and wherein the first sensing cells are connected in the first direction by the first connecting patterns positioned in layers different than layers having the first sensing cells.

9. The touch screen panel as claimed in claim 1, wherein the second sensing cells are integrally connected to the second connecting patterns.

10. The touch screen panel as claimed in claim 1, wherein the first sensing cells and the second sensing cells are alternatively spaced apart from each other in a same layer.

11. The touch screen panel as claimed in claim 1, further comprising dummy patterns formed between the prominences of the sensing cells.

12. The touch screen panel as claimed in claim 11, wherein the dummy patterns are formed apart from each other in a same layer as a layer having the sensing cells.

13. The touch screen panel as claimed in claim 11, wherein a shortest distance between the dummy patterns and the prominences of the sensing cells is within a range of 2 µm to 6 µm.

14. The touch screen panel as claimed in claim 11, wherein the dummy patterns are positioned in layers different than a layer having the sensing cells, and wherein insulating layers are disposed between the dummy patterns and the sensing cells.

15. The touch screen panel as claimed in claim 14, wherein the dummy patterns are formed to overlap ends of the prominences of the adjacent ones of the sensing cells.

16. The touch screen panel as claimed in claim 1, wherein the first sensing cells and the second sensing cells are alternately disposed in different layers, and wherein insulating layers are disposed between the first sensing cells and the second sensing cells.

17. The touch screen panel as claimed in claim 16, wherein prominences of the first sensing cells are formed to overlap prominences of adjacent ones of the second sensing cells.

18. The touch screen panel as claimed in claim 1, wherein the prominences are formed at ends of the sensing cells not having the connecting patterns.

* * * * *